United States Patent [19]

Makaran et al.

[11] Patent Number: 5,675,464

[45] Date of Patent: Oct. 7, 1997

[54] STALL OR REDUCED-SPEED PROTECTION SYSTEM FOR ELECTRIC MOTOR

[75] Inventors: John E. Makaran; Jerzy Muszynski, both of London, Canada

[73] Assignee: Siemens Electric Limited, Mississauga, Ontario, Canada

[21] Appl. No.: 643,133

[22] Filed: May 2, 1996

[51] Int. Cl.$^6$ ............................................ H02H 5/04
[52] U.S. Cl. .................. 361/23; 361/115; 361/30
[58] Field of Search .................. 361/23, 24, 25, 361/115, 30

[56] References Cited

U.S. PATENT DOCUMENTS

| | | | |
|---|---|---|---|
| 3,937,974 | 2/1976 | Lafuze | 290/46 |
| 4,162,435 | 7/1979 | Wright | 318/138 |
| 4,240,015 | 12/1980 | White | 318/338 |
| 4,322,668 | 3/1982 | Trussler | 318/434 |
| 4,403,177 | 9/1983 | Weber et al. | 318/254 |
| 4,490,661 | 12/1984 | Brown et al. | 318/661 |
| 4,494,058 | 1/1985 | Berti | 318/372 |
| 4,651,069 | 3/1987 | Pellegrini | 318/254 |
| 4,678,973 | 7/1987 | Elliott et al. | 318/254 |
| 4,694,210 | 9/1987 | Elliott et al. | 310/68 R |
| 4,883,982 | 11/1989 | Forbes et al. | 310/62 |
| 4,928,043 | 5/1990 | Plunkett | 318/254 |
| 4,992,169 | 2/1991 | Izumiya | 210/221.2 |
| 4,992,710 | 2/1991 | Cassat | 318/254 |
| 5,001,405 | 3/1991 | Cassat | 318/254 |

(List continued on next page.)

FOREIGN PATENT DOCUMENTS 4310260  9/1994  Germany ........................... H02P 6/00

OTHER PUBLICATIONS

Switchgear and Control Handbook, Smeaton, Robert W., Second Edition, McGraw–Hill Book Company, pp. 29–1 through 29–14.

Primary Examiner—Jeffrey A. Gaffin
Assistant Examiner—Stephen Jackson

[57] ABSTRACT

A protection system for an electric motor is disclosed. The system is adapted for providing protection to the motor in the event of a stall or reduced-speed condition. The system includes a sensor providing a first signal representative of the speed of the motor, a detection circuit receiving the first signal and providing a second signal indicative of whether the motor is in a stall or reduced-speed condition, and a switching circuit receiving the second signal and interrupting power supply to the motor when the second signal indicates that the motor is in the stall or reduced-speed condition.

20 Claims, 3 Drawing Sheets

U.S. PATENT DOCUMENTS

| | | | |
|---|---|---|---|
| 5,017,845 | 5/1991 | Carobolante et al. | 318/138 |
| 5,017,846 | 5/1991 | Young et al. | 361/23 |
| 5,019,756 | 5/1991 | Schwarz | 318/254 |
| 5,023,527 | 6/1991 | Erdman et al. | 318/254 |
| 5,023,528 | 6/1991 | Saidin et al. | 318/254 |
| 5,028,852 | 7/1991 | Dunfield | 318/254 |
| 5,043,642 | 8/1991 | Ohi | 318/254 |
| 5,053,686 | 10/1991 | Juarez | 318/254 |
| 5,075,608 | 12/1991 | Erdman et al. | 388/934 |
| 5,117,165 | 5/1992 | Cassat et al. | 318/254 |
| 5,125,067 | 6/1992 | Erdman | 388/934 |
| 5,187,417 | 2/1993 | Minnich et al. | 318/254 |
| 5,196,771 | 3/1993 | Naito | 318/254 |
| 5,206,567 | 4/1993 | Sakurai et al. | 312/254 |
| 5,208,518 | 5/1993 | Grapenthin et al. | 318/138 |
| 5,210,474 | 5/1993 | Oswald | 318/254 |
| 5,227,704 | 7/1993 | Erdman | 318/254 |
| 5,233,275 | 8/1993 | Danino | 318/254 |
| 5,241,247 | 8/1993 | Salerno et al. | 318/254 |
| 5,245,256 | 9/1993 | Cassat et al. | 318/254 |
| 5,254,914 | 10/1993 | Dunfield et al. | 318/254 |
| 5,254,918 | 10/1993 | Ueki | 318/466 |
| 5,298,838 | 3/1994 | Peters et al. | 318/138 |
| 5,325,026 | 6/1994 | Lyons et al. | 318/254 |
| 5,327,053 | 7/1994 | Mann et al. | 318/254 |
| 5,334,917 | 8/1994 | Lind | 318/254 |
| 5,336,956 | 8/1994 | Haner | 310/179 |
| 5,343,127 | 8/1994 | Maiocchi | 318/254 |
| 5,349,257 | 9/1994 | Hernden | 310/68 B |
| 5,350,987 | 9/1994 | Ueki | 318/466 |
| 5,367,234 | 11/1994 | DiTucci | 318/254 |
| 5,376,866 | 12/1994 | Erdman | 318/254 |
| 5,378,967 | 1/1995 | Naito | 318/254 |
| 5,382,889 | 1/1995 | Peters et al. | 318/254 |
| 5,382,890 | 1/1995 | Moh et al. | 318/254 |
| 5,384,527 | 1/1995 | Rozman et al. | 322/10 |
| 5,389,862 | 2/1995 | Tominaga | 318/254 |
| 5,397,972 | 3/1995 | Maiocchi | 318/439 |

STALL OR REDUCED-SPEED PROTECTION SYSTEM FOR ELECTRIC MOTOR

FIELD OF THE INVENTION

The present invention relates to an electric motor with a stall or reduced-speed protection system. In particular, the present invention relates to an electric motor protected from a stall or reduced-speed condition by means of an electronic circuit receiving information from a motion sensor.

BACKGROUND OF THE INVENTION

It is known that an electric motor, alternating current (AC) or direct current (DC), driving a load may at times be subjected to a stall or reduced-speed condition. For example, in a common automotive application, the motor driving the engine cooling fan may be subjected to a stall or reduced speed condition when the fan blades are partially or wholly obstructed and therefore unable to rotate freely. When such an obstruction is present, there is a risk that the motor will continue to draw additional power in an attempt to drive the load notwithstanding the obstruction, which may result in damage to the motor. In addition, the stall or reduced-speed condition poses a risk of overheating not only the motor but also other components in the proximity of the motor.

Systems for protecting the motor from damage or overheating in a stall or reduced-speed condition are known. These known systems commonly include circuitry external to the motor that provide such protection by interrupting the supply of power to the motor when the condition is detected. However, these known systems tend to be relatively complex electronically and to require additional physical space (in addition to the space occupied by the motor itself), which can be at a premium in automotive applications.

Given the space and weight limitations presented by many applications, particularly in automotive applications, it would be advantageous to have a system for protecting a motor in the event of a stall or reduced-speed condition that is relatively compact yet provides all necessary functionality. It would also be advantageous to have a protection system that can readily be programmed to operate suitably under a wide variety of operating conditions and applications. It would further be advantageous to have a protection system having circuitry that can be integrated physically and electrically within the motor and associated circuitry, and possibly with other systems within the application such as vehicle computer or peripheral accessory controls (i.e. cooling fan module control). It would be highly advantageous to have a low-cost protection system that is relatively simple in design and light in weight.

SUMMARY OF THE INVENTION

The present invention relates to a protection system for an electric motor having a sensor providing a first signal representative of the speed of the motor, a detection circuit receiving the first signal and providing a second signal indicative of whether the motor is in a stalled or reduced-speed condition, and a switching circuit receiving the second signal and interrupting power supply to the motor when the second signal indicates that the motor is in a stalled or reduced-speed condition.

DETAILED DESCRIPTION OF THE PREFERRED EMBODIMENTS

Figure 1:
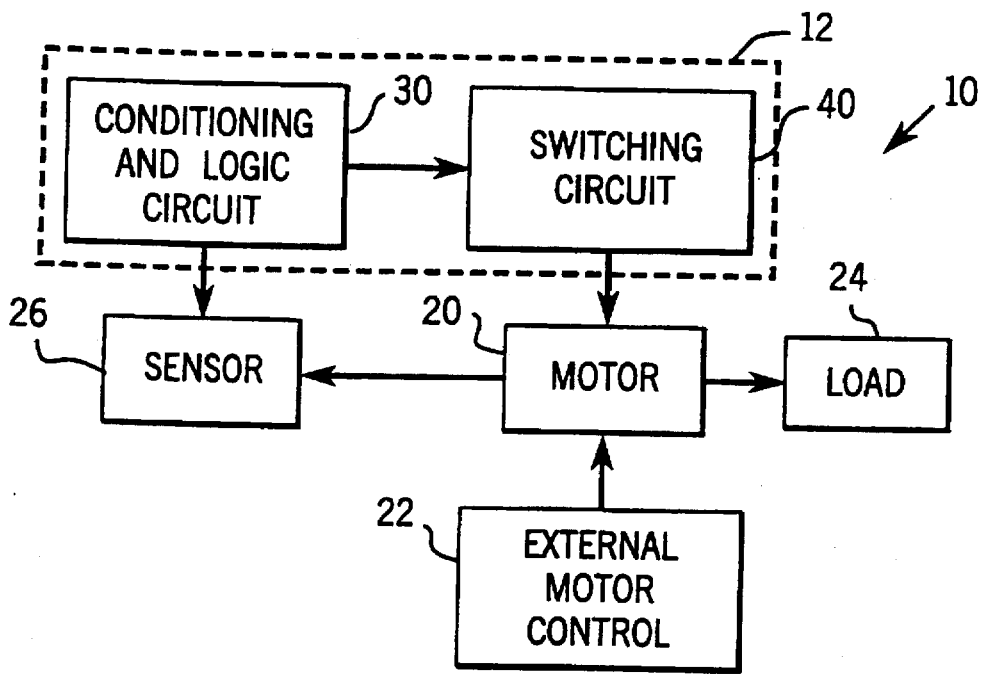
FIG. 1 is a block diagram of a stall or reduced-speed protection system for an electric motor.

Referring now to FIG. 1, a block diagram of an electric motor with a stall or reduced-speed protection system is shown. System 10 includes motor 20, which is controlled by an external motor controller 22 and which drives a load 24. Motor 20 is intended to represent any type of electric motor, operating either from an AC (alternating current) or DC (direct current) voltage supply. External motor controller 22 is intended to represent any control system that can be coupled to an electric motor, operated by any control scheme (i.e. under human control, automatic control, or any other type of control). Load 24 is intended to represent any type of apparatus to which an electric motor may be called upon to supply driving power. System 10 may be used in a wide variety of applications employing an electric motor but is particularly well-suited to automotive applications.

As shown in FIG. 1, system 10 includes a sensor 26 to provide a signal based on the speed of motor 20 to a conditioning and logic circuit 30, and a switching circuit 40 which receives an output signal from conditioning and logic circuit 30 indicating whether a stall or reduced-speed condition is present and controls the supply of power to motor 20 based on the output signal. Conditioning and logic circuit 30 and switching circuit 40 will at times be referred to collectively as the protection circuit 12. Sensor 26, which provides a signal representative of the speed of the motor to conditioning and logic circuit 30, can be of any type suitable to provide the signal, such as a current monitor, a back EMF (electromotive force) monitor, an opto-electronic or magnetic device, or the like. In other embodiments, sensor 26 may provide a digital signal or some other type of conditioned signal (e.g. a DC voltage signal or the like) to protection circuit 12. In some applications, motor 20 may itself directly provide a signal representative of the motor speed (e.g. where the sensor function has been integrated into the motor), such as current ripple due to commutation. In any preferred embodiment, all that is necessary is for a signal representative of the motor speed (however determined) to be provided to the protection circuit.

Conditioning and logic circuit 30 processes the signal representative of the motor speed to determine whether a stall or reduced-speed condition is present (e.g. whether the motor is turning freely or not). Conditioning and logic circuit 30 may be designed to eliminate or at least reduce the effect of transient or spurious signals received from the sensor that are not representative of the motor speed. In any preferred embodiment, protection circuit 12 incorporates a selectable time delay so that power to the motor 20 will be interrupted only if the signal representative of the motor speed indicates that motor 20 has not been turning for a specified period of time. This time delay may reduce the possibility of nuisance tripping upon motor startup. The time delay may be varied as desired to suit the operating parameters of the particular application. In addition, conditioning and logic circuit 30 incorporates a selectable minimum threshold speed, i.e. speed below which a reduced-speed condition will be indicated and power to the motor will be interrupted. Conditioning and logic circuit 30 provides an output signal indicating the existence of a stall or reduced-speed condition. In any preferred embodiment, the protection circuit 12 allows the parameters defining a stall or reduced-speed condition to be "programmed" as needed for the particular application by hardware or software.

The protection circuit 12 may be designed to reset by cycling the power to the system, or to be self-resetting after an operator selectable delay time. Switching circuit 40 is activated by the output signal provided by conditioning and logic circuit 30 to interrupt the supply of power to motor 20 when a stall or reduced-speed condition has been indicated. Switching circuit 40 may itself be configured to interrupt power to motor 20, or may be used to provide an appropriate signal to an external switching device (or series of external switching devices) which in turn interrupts power to motor 20. Motor 20 will then be shut off until being reset and restarted.

Protection circuit 12 may also be configured to provide a signal to the external motor controller or operator 22 indicating that a stall or reduced-speed condition has been detected. The protection circuit 12 may also have the capability of providing externally visible instrumentation signal representative of the motor speed for the operator or to inform the operator of whether a stall or reduced-speed condition exists.

All or part of the function of the protection circuit 12 may be performed by other electronic circuits and systems present within the application that have the appropriate functional capacity. For example, in an automotive application, the logic function of the protection circuit 12 may be provided by a microcontroller (or a microcomputer or any other suitably appropriate device) that is also used to perform tasks related to other automotive systems. For example, the switching function of the protection circuit 12 may be provided by a solid state relay circuitry or electronic switch, such as a MOSFET, Darlington transistor, SCR or other suitably appropriate switching device, elsewhere within the automotive electronics having the capacity to provide that ability. The capability of using other available capacity from other electronic systems in the application may allow a reduction in the overall size and weight of the protection circuit 12 itself. In any preferred embodiment, the protection circuit 12 will also meet general protection specifications, i.e. reverse battery, load dump, overcurrent, overvoltage, etc.

The constituent parts of the protection circuit 12 may be wholly integral to the motor 20 or wholly separate from the motor 20. Alternatively, the constituent parts of the protection circuit 12 may be in part integral to and in part separate from the motor 20. For example, the protection circuit 12 could be housed in the endcap, brush card, or connector of the motor 20 to save space. The protection circuit 12 may also control an external relay or a relay integrated within the motor electronic circuitry. Alternatively, the protection circuit 12 and relay may be in series with the motor, e.g. as part of the wiring harness. Location of the constituent parts of the protection circuit 12 may be determined by customer requirements, manufacturing considerations, size and shape constraints, physical conditions or the like.

Figure 2:
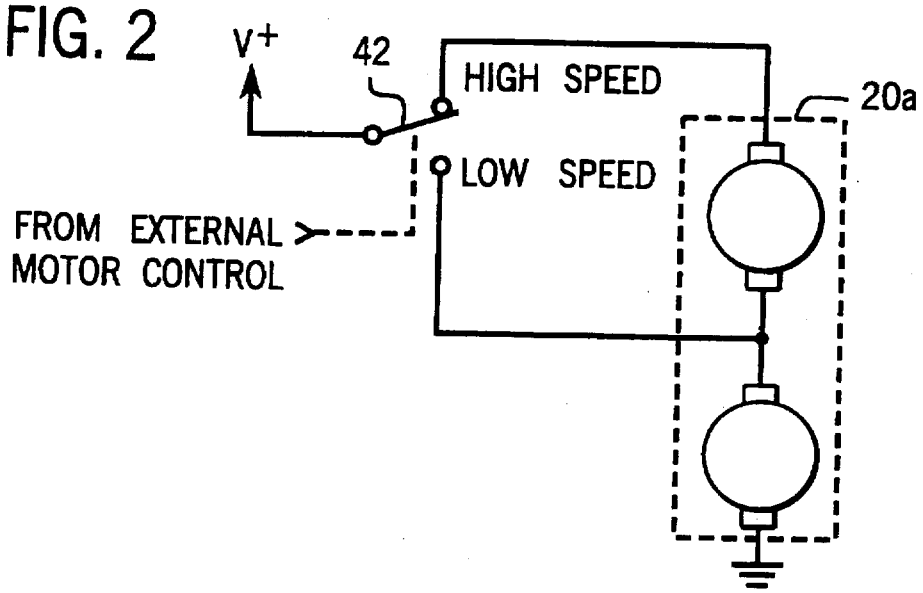
FIG. 2 is a schematic diagram of a two-speed electric motor.
Figure 3:
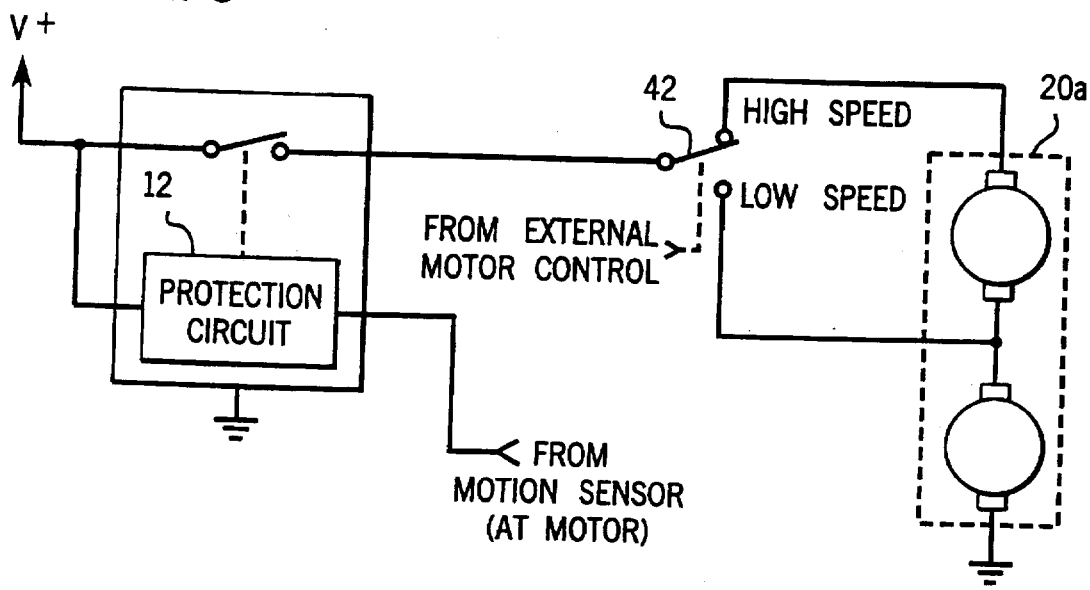
FIG. 3 is an schematic diagram of a stall or reduced-speed protection system for a two-speed electric motor.

Referring now to FIGS. 2 through 5, an exemplary embodiment of the protection system 12 developed for a four-pole two-speed motor 20a is shown. FIG. 2 shows a schematic diagram of motor 20a without stall or reduced-speed protection. One of two speeds (high or low) of motor 20a is selectable via an externally controlled relay, shown as switch 42. FIG. 3 shows a schematic diagram of the motor 20a with protection. In this embodiment, the supply of power to motor 20a is interrupted by a relay in series with the battery voltage supply terminal.

Figure 4:
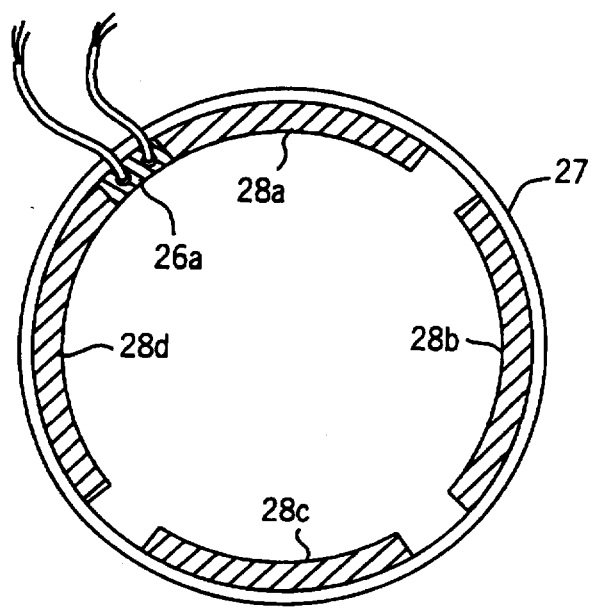
FIG. 4 is an cut-away view of a motor housing showing the placement of a variable reluctance speed coil within the stator assembly.

In alternative embodiments, the switching task may be effected by a semiconductor relay, a semiconductor switch, a silicon-controlled rectifier, a Hall-effect device, an electromagnetic device or any other suitably appropriate switching device known in the art. The sensor in this embodiment is a variable reluctance speed coil 26a placed between the magnets 28a through 28d in the stator or housing 27, as indicated in FIG. 4. Speed coil 26a within motor 20a will provide an AC voltage signal representative of the motor speed to protection circuit 12.

Figure 5:
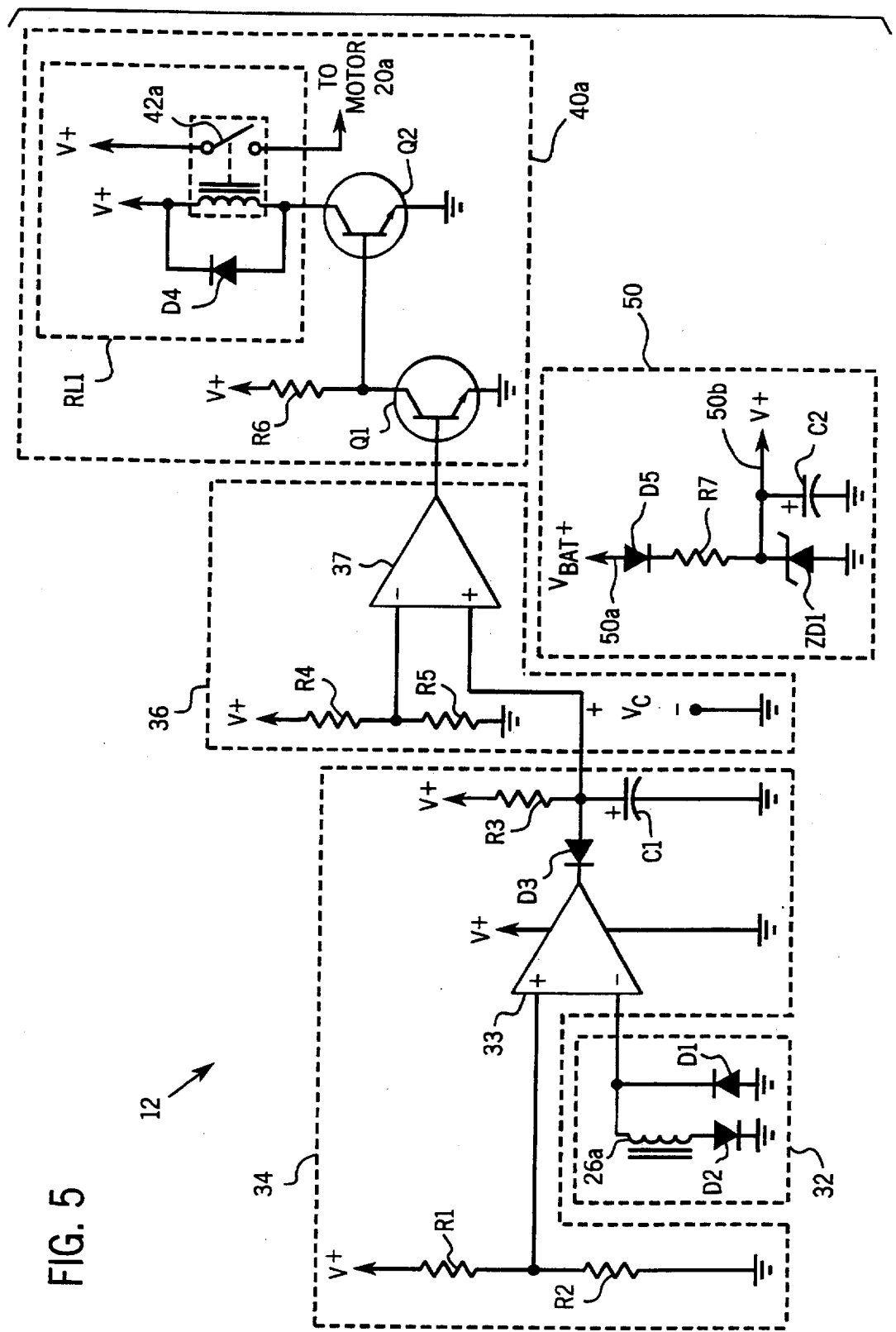
FIG. 5 is an electrical circuit schematic diagram of an exemplary embodiment of a stall or reduced-speed protection system for an electric motor.

FIG. 5 shows an electronic schematic of the protection circuit 12. Protection circuit 12 as shown includes five sub-circuits designated within dashed boxes: a supply voltage conditioning circuit 50; an AC signal conditioning circuit 32; an AC-to-DC conversion circuit 34; a logic circuit 36; and a switching circuit 40. Speed coil 26a is also shown in FIG. 5.

Supply voltage conditioning circuit 50 regulates the battery voltage $V_{BAT}$ provided at input terminal 50a to provide a relatively stable supply voltage $V^+$ available at output terminal 50b. This supply voltage $V^+$ is then made available to other circuits within protection system 12. Supply voltage conditioning circuit 50 includes a diode D5 and a resistor R7 coupled between terminal 50a and ground by a zener diode ZD1 and capacitor C2, which is in parallel with ZD1. Also included is a varistor VR1, which is designed to protect the circuit from transient voltages or alternator load dumps. Voltage conditioning is desirable because the battery voltage level may fluctuate when the motor is stalled, when motor speed is reduced or when the current draw by the motor increases. To prevent erratic circuit operation during a stall condition, zener diode ZD1 should be selected to have a voltage of about 10 percent less than the smallest value of battery voltage that will be anticipated during a stall condition. In an exemplary embodiment, where motor 20a is rated at 300 watts and 12 volts, zener diode ZD1 has a value of 8.2 volts (500 milliwatts), resistor R7 has a value of 1K ohms and capacitor C2 has a value of 10 microfarads.

In AC signal conditioning circuit 32, the output AC signal representative of the motor speed provided by speed coil 26a is made available at the inverting input terminal of comparator 33, e.g., an operational amplifier configured to serve as a voltage comparator. AC signal conditioning circuit 32 provides voltage level translation for the output signal from speed coil 26a. Level translation is provided by coupling the terminal where the output signal from speed coil 26a is provided to ground between diode D1 and diode D2 having reverse polarity, in parallel, which act as a clipping circuit to limit peak voltages. In an alternative embodiment, zener diodes (not shown) could be used in place of diodes D1 and D2 to adjust the voltage level made available at the inverting input terminal of comparator 33 to a desired reference level. In a preferred exemplary embodiment, AC signal conditioning circuit 32 receives an AC input signal representative of the motor speed and provides a level-translated output signal representative of the AC input signal that is peak voltage limited.

In AC-to-DC conversion circuit 34, the output signal of AC signal conditioning circuit 32 is provided to the inverting input terminal of comparator 33 and the supply voltage $V^+$ is provided through series resistor R1 to the non-inverting input terminal of comparator 33 and through series resistor R2 to ground (i.e. a voltage divider). The output terminal of comparator 33 is coupled through diode D3 to the supply voltage through series resistor R3 and to ground through capacitor C1, as will be described subsequently. AC-to-DC conversion circuit 34 receives as one input signal the output signal from AC signal conditioning circuit 32, which is representative of the motor speed, and as the other input signal the supply voltage; AC-to-DC conversion circuit 34 provides an output DC signal representative of the motor speed. According to the exemplary embodiment, resistor R1 has a value or 47K ohms, resistor R2 has a value of 47K ohms, resistor R3 has a value of 47K ohms, and capacitor C1 has a value of 10 microfarads.

In the exemplary embodiment, if the input signal from speed coil 26a is greater in voltage than the threshold voltage level of comparator 33, as set by the values of resistors R1 and R2, the output of comparator 33 will be low thereby indicating that no stall or reduced-speed condition exists. If the input signal from speed coil 26a is lower in voltage than the threshold level of comparator 33, the output of comparator 33 will be high thereby indicating a stall or reduced-speed condition. The input signal from speed coil 26a is zero volts when the motor is not turning (i.e., a stall condition). As a result, the output of comparator 33 will be high thereby indicating a stall condition. Since the input signal from speed coil 26a is larger in magnitude (i.e., in voltage) for faster motor speeds, one may set a range of speeds by adjusting the values of resistors R1 and R2 below which the output of comparator 33 will remain high so as to adjust the threshold of comparator 33. This sets the threshold level for reduced-speed detection. In a commonly preferred embodiment, the threshold would be set at approximately 20 percent of the motor speed.

Logic circuit 36 includes an operational amplifier configured as a monostable timer 37 (i.e., a timer that turns "on" or goes high after constant input signals have been present at the input terminals for a certain period of time). Logic circuit 36 provides a direct current output signal through diode D3, i.e., at the output terminal of timer 37. The output signal of AC-to-DC conversion circuit 34 is provided to the non-inverting input terminal of timer 37 and the supply voltage is provided through series resistor R4 to the inverting input terminal of timer 37 and through series resistor R5 to ground. Capacitor C1 charges at an exponential rate through resistor R3. When the voltage $V_c$ across capacitor C1 goes above the threshold voltage of timer 37 (a voltage set by the values of resistors R4 and R5), the output of timer 37 will be high thereby indicating a stall or reduced-speed condition. The threshold voltage of timer 37 may be adjusted by changing the values of resistors R4 and R5. In the exemplary embodiment, resistor R4 has a value of 47K ohms and resistor R5 has a value of 47K ohms. Since in the AC-to-DC conversion circuit 34, capacitor C1 charges exponentially (i.e., according to a time constant) through resistor R3, the maximum time taken before power to motor 20a is interrupted upon detection of a stall or reduced-speed condition may be adjusted. If motor 20a is operating at a continuous speed above the speed threshold (i.e., in an unobstructed state), the signal from speed coil 26a exceeds the voltage threshold level of comparator 33 and the output of the comparator 33 will be low. As a result, capacitor C1 will discharge through diode D3 preventing an increase in voltage $V_c$ across capacitor C1, and the voltage $V_c$ across capacitor C1 will never exceed the threshold voltage of timer 37. Accordingly, a stall or reduced-speed condition will not be indicated and power to motor 20a will not be interrupted.

Switching circuit 40a includes transistors Q1 and Q2 and a relay RL1, which control the supply of power to motor 20a based on the output signal of timer 37. If the output signal of timer 37 is high, transistor Q1 is turned on, which turns off transistor Q2, deenergizing the relay RL1 (which is coupled to the battery voltage in parallel with diode D4) and opening switch 42a, which interrupts the supply of power (i.e. from the battery voltage) to motor 20a. If the output signal of timer 37 is low, transistor Q1 is turned off and transistor Q2 is turned on by a supply voltage provided through series resistor R6, which energizes relay RL1 and closes switch 42a, maintaining the supply of power to motor 20a.

In an alternative embodiment (not shown), the output signal of the AC-to-DC conversion circuit 34 may be coupled to the inverting input terminal of the timer and the non-inverting input terminal of the timer is coupled to ground. In this embodiment, the output terminal of the timer is provided directly to transistor Q2. That is, resistors R4, R5 and R6 and transistor Q1 are removed from the switching circuit.

In the exemplary embodiment, to reset the protection circuit 12 following the detection of a stall or reduced-speed condition, the protection circuit 12 must be shut off or cleared before the motor is restarted. In applications where it is desirable, the protection circuit 12 may be provided with a reset switch (not shown), for example, through a capacitor discharge circuit known to those having skill in the art.

It is understood that, while the detailed drawings, specific examples, and particular components values given describe preferred embodiments of the present invention, they serve the purpose of illustration only. The apparatus of the invention is not limited to the precise details and conditions disclosed. Other substitutions, modifications, changes and omissions may be made in the design, operating conditions and arrangement of the preferred embodiments without departing from the spirit of the invention as expressed in the appended claims.

What is claimed is:

1. A protection system for an electric motor, which comprises:

a sensor providing a first signal representative of a speed of the motor;

a detection circuit receiving the first signal and providing a second signal indicative of whether the motor is in a stall or reduced-speed condition; and a switching circuit receiving the second signal and interrupting supply of power to the motor when the second signal indicates that the motor is in the stall or reduced-speed condition, wherein said sensor, said detection circuit and said switching circuit are incorporated into the motor.

2. The system according to claim 1 wherein the detection circuit includes a voltage conditioning circuit, a voltage conversion circuit and a logic circuit.

3. The system according to claim 1 wherein the detection circuit includes means for selectively defining the reduced-speed condition.

4. The system according to claim 1 wherein the sensor is a variable reluctance speed coil.

5. The system according to claim 1 wherein the switching circuit includes a relay.

6. The system according to claim 1 further comprising means for providing the second signal to a controller for the motor.

7. The system according to claim 1, wherein said sensor is placed between a first magnet and a second magnet in said electric motor.

8. The system according to claim 1, wherein said sensor senses at least one of current and voltage drawn by the motor.

9. The system according to claim 1 wherein the detection circuit includes a logic circuit.

10. The system according to claim 9 wherein the detection circuit includes a time delay circuit.

11. A protection system for an electric motor which comprises:

sensor means for providing a first signal representative of a speed of the motor;

detection means for receiving the first signal and for providing a second signal indicative of whether the motor is in a stall or reduced-speed condition; and switching means for receiving the second signal and for interrupting supply of power to the motor when the second signal indicates that the motor is in the stall or reduced-speed condition; and said electric motor having a housing wherein said sensor means and one of said detection means and said switching means are disposed within said housing.

12. The system according to claim 11 wherein the detection means includes a voltage conditioning circuit, a voltage conversion circuit and a logic circuit.

13. The system according to claim 10 wherein said sensor means senses at least one of current and voltage drawn by the motor.

14. The system according to claim 10, wherein said sensor means includes a variable reluctance coil.

15. An electric motor comprising:

a housing for housing a first magnet and a second magnet, said housing including an endcap;

a sensor providing a first signal representing motor speed, said sensor being disposed in between said first and said second magnets;

a detector for receiving said first signal and providing a second signal indicative of whether the motor is in a stall or a reduced-speed condition; and a switch for switching off said motor when said second signal indicates that the motor is in said stall or reduced-speed condition, wherein at least one of said detector and said switch is disposed within said housing.

16. The electric motor of claim 15, wherein said detector and said switch are disposed within said endcap.

17. The electric motor of claim 15, wherein said motor further includes a brush card, and one of said detector and switch is disposed on said brush card.

18. The electric motor of claim 15, wherein said detector and switch are portions of a microcontroller.

19. The electric motor of claim 15, wherein said sensor is a variable reluctance coil.

20. The electric motor of claim 15, further including a connector for electrically connecting to said motor, wherein said switch is disposed on said connector.

\* \* \* \* \*